United States Patent Office 3,041,304

Patented June 26, 1962

3,041,304

PROCESS FOR CURING HALOGENATED BUTYL RUBBER WITH A BIVALENT METAL OXIDE AND AN ORGANIC POLYTHIOL COMPOUND, AND PRODUCT OBTAINED THEREBY

Irwin J. Gardner, Roselle Park, Samuel B. Robison, Roselle, and Henry S. Makowski, Carteret, N.J., assignors to Esso Research and Engineering Company, a corporation of Delaware No Drawing. Filed Oct. 23, 1958, Ser. No. 769,100
13 Claims. (Cl. 260—41.5)

The present invention relates to rubbery compositions containing halogenated low unsaturation polymers as well as the preparation and vulcanization of such compositions. More particularly, it relates to improved methods for curing rubber containing a substantial amount of halogenated low unsaturation polymer with minor amounts of substances having more than one thiol group.

Thiol compounds, i.e. compounds containing —SH groups, have heretofore been employed to form cross-links between molecules of high unsaturation rubbers, such as butadiene-styrene rubber (GR—S), and monothiols have been reacted with which polymers in olefin type studies as well as in preparation of modified rubbers, e.g. modified polybutadiene. While these compounds have been shown to have some effect as cross-linking agents, they have never been widely accepted as curing agents for high unsaturation rubber because of many difficulties which have been encountered. Moreover, when these compounds have been employed in an attempt to vulcanize low unsaturation rubber, such as butyl rubber, the result has been that the rubbers are either not cured or are of a poor quality. Therefore, these polythiol compounds are not considered suitable curing agents for butyl rubber.

It has now been discovered that polythiol compounds will cure halogenated low unsaturation rubbers and produce vulcanizates having excellent physical, dynamic, flexing and chemical properties. For instance, a major proportion of halogenated butyl rubber may be cured with minor proportions of various polythiol organic compounds under ordinary conditions well known in the art.

The present invention is not restricted to any particular polythiol organic compound since the critical feature is the combination of an organic compound having more than one thiol group attached to it and halogenated low unsaturation rubber. While it is necessary that the thiol compound contain at least two thiol groups, additional thiol groups, as well as other reactive or unreactive groups, may be attached to the basic carbon chain or carbon ring structure. For instance, besides the thiol groups there may also be present oxygen-containing groups such as alcohols, acids, esters, aldehydes, ketones, etc. Most of the polythiol compounds coming within the scope of the invention contain from 1–30 or more carbon atoms and may generically be classified as polythiol alkanes, polythiol alkenes, polythiol cycloalkanes, polythiol cycloalkenes and derivatives thereof. While the polythiol compounds may have as many as 6 thiol groups, the preferred compounds contain from 2–4 such groups.

A generic formula that may be used to define the dithiol compounds which come within the purview of the invention is as follows:

HS—R—SH wherein H is hydrogen; S is sulfur; and R is an alkane, alkene, cycloalkane, cycloalkene or derivatives thereof containing from 1 to 20 or 30 carbon atoms (preferably a $C_1$ to $C_{10}$ alkyl or a $C_1$ to $C_{20}$ cycloalkene).

Some specific polythiols that may be used in the practice of the present invention include:

| | |
|---|---|
| 1,2 ethane dithiol | Bismercaptomethyl-m-xylene |
| 1,3 propane dithiol | Bismercaptomethyl durene |
| 1,4 butane dithiol | 2,4,6 mercaptomethyl phenol |
| 1,5 pentane dithiol | 1,2,3 propane trithiol |
| 1,6 hexane dithiol | |
| Glycol dimercaptoacetate | |
| Bismercaptomethyl-m-benzene | |

The preferred halogenated low unsaturation compound is halogenated butyl rubber. Butyl rubber is a polymer which contains about 85 to 99.5 wt. percent of a $C_4$ to $C_7$ isoolefin, such as isobutylene, and about 15 to 0.5 wt. percent of a multiolefin containing 4 to 14 carbon atoms, and preferably about 4 to 6 carbon atoms. While the preferred multiolefin is isoprene, other conjugated diolefins such as butadiene-1,3, dimethylbutadiene and piperylene may be employed. Butyl rubber or GR–I rubber (Government Rubber-Isobutylene) generally has a mole percent unsaturation between 0.5 and 15 and a viscosity average molecular weight of from about 200,000 to 1,500,000 or more. Its preparation is described in U.S. Patent 2,356,128 issued to R. M. Thomas et al. and elsewhere in the literature.

The halogenated butyl rubber most suitable for the purposes of the present invention is butyl rubber which has been carefully halogenated so as to contain at least 0.5 wt. percent (preferably about 1 wt. percent) of combined halogen but not more than about "X" wt. percent combined chlorine or 3 "X" wt. percent of combined bromine wherein:

$$X=\frac{M_3L}{(100-L)M_1+L(M_2+M_3)}\times 100$$

and $L$=mole percent of the multiolefin in the polymer
$M_1$=molecular weight of the isoolefin
$M_2$=molecular weight of the multiolefin
$M_3$=atomic weight of chlorine or bromine Restated, there should be at least about 0.5 weight percent of combined halogen in the polymer but not more than about one atom of chlorine or 3 atoms of bromine combined in the polymer per molecule of multiolefin present therein; i.e., not more than about one atom of combined chlorine or three atoms of combined bromine per double bond in the polymer.

Suitable halogenating agents which may be employed are gaseous chlorine, liquid bromine, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tri-bromophenol bromide, N-chloroacetamide, beta-bromo-methyl phthalimide, N,N'-dimethyl-5,5 dichloro or dibromo hydantoin, and other common halogenating agents.

The halogenation is generally conducted at above 0° to about +100° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above-mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 2%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C. (e.g. 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 to 15.0, preferably about 0.6 to 5.0.

The quantity of polythiol organic compound, or mixtures thereof, blended with the halogenated butyl rubber and other ingredients will, of course, depend on the properties desired in the vulcanizate. Thus, the amount of polythiol organic compound employed may range from as little as 0.1 part by weight per 100 parts by weight of rubber (phr.) to as much as 15 phr. or more. However, in most instances it is necessary to use at least about 0.5 phr. of the polythiol organic compound in order to obtain a vulcanizate having good properties. Moreover, for polythiol compounds having molecular weights below 300, it is generally desirable to use not more than 5 or 10 phr. of polythiol. Since it is believed that the polythiols react with the halogen contained in the low unsaturation polymers and since the halogen content of the polymer may vary, it is usually best to use from about 0.25 to 0.75 mole of polythiol compound for each mole atom of halogen in the polymer.

While the polythiol compounds of the present invention are suitable curing agents in themselves, it is sometimes desirable to include in the rubber recipe a minor amount, say 0.5 to 10 phr., of a bivalent metal oxide, e.g. tin oxide, lead oxide and especially zinc oxide. It has been noted that metal oxides, the metal portion of which is a low melting metal selected from groups IIB and IVA of the Periodic Chart (Lange's Handbook of Chemistry, 8th edition), not only co-cure the halogenated low unsaturation rubber but also appear to accelerate and enhance the curing action of the polythiols themselves. It is believed that the polythiol reacts with the metal oxide to produce a polymercaptide which will rapidly react with labile halogen atoms to effect cross-links at a rate considerably higher than the polythiol itself. Therefore, where high tensile strength rubber compounds are needed, it is advisable to employ from about 1 to 5 phr. of metal oxide.

Prior to vulcanizing the halogenated low unsaturation rubber with the polythiol organic compounds of the present invention, in the presence or absence of zinc oxide, conventional amounts of fillers such as carbon black, clay, etc. may be compounded with the rubber. For instance, the rubber recipe may include from 30 to 70 phr. of carbon black or finely divided siliceous material, 0.1 to 10 phr. of an accelerator, such as benzothiazyl disulfide, tetramethyl thiuram disulfide or 2-mercaptoimidazoline, about 0.1 to 5 phr. of stearic acid, conventional amounts of hydrocarbon extender oils and plasticizers as well as minor amounts of tackifiers.

The rubber stocks compounded according to the present invention may include, in addition to those things mentioned above, other polymers such as butadiene-styrene polymer, natural rubber, polyisobutylene, polyisoprene, polychloroprene, butyl rubber and reclaimed butyl rubber. It is only necessary to have a sufficient quantity of halogenated low unsaturation rubber in the recipe to produce a vulcanizate having the physical properties required for the particular article which will contain the vulcanized rubber. Moreover, it may be desirable in certain instances to have other curing agents present, such as sulfur, sulfur compounds, and dimethylol-para- or meta- alkyl substituted phenol resins. These ingredients may be used in conventional quantities.

The halogenated, low unsaturation rubbers compounded according to the present invention may be used in many articles that are made wholly or partially with rubber. For example, they may be employed in tires, curing bladders and bags, hoses, wire insulations, conveyor belts, etc. They may be emulsified in an aqueous system or dissolved in an organic solvent, such as hexane, and used to treat fabrics, especially cotton, nylon or rayon tire cords. The latices and cements prepared with rubber compounded in accordance with the present invention may be used to adhere various fabrics or metals, as well as various rubber stocks, including stocks containing natural rubber and butadiene-styrene rubber. In the case of latices, when bonding fabric to rubber, it is generally advisable to have a minor amount of a phenolic-aldehyde resin, such as resorcinol formaldehyde resin, in the dip. Sometimes, it is desirable to include in the dip a small quantity of the polythiol organic compounds of the present invention. The polythiols may be used in combination with the resin or in lieu thereof.

The rubber stocks compounded according to the present invention may be vulcanized according to processes well known in the art. For instance, the compounded rubber may be press cured or steam cured at elevated temperatures, say from 250 to 400° F., for from a few minutes up to several hours. It is preferable in most instances to carry out the vulcanization at a temperature between 250 and 350° F. for from 5 to 90 minutes. The vulcanization time is usually shorter when higher temperatures are employed and longer when lower temperatures are used. Relatively speaking, the cure is generally quite rapid and the physical, chemical, dynamic, etc. properties of the vulcanizate are superior to those obtained with zinc oxide alone or combinations of zinc oxide and accelerators, such as tetramethyl thiuram disulfide. Some of the polythiol organic compounds, especially the higher alkyl and aromatic derivatives when compounded according to the present invention, produce rubber stocks which have a Mooney Scorch as high as 30 minutes or more (Small Mooney-minutes to cause a 5 point rise) at 260° F.

As already mentioned, the polythiols do not cure butyl rubber. This is demonstrated by an experiment in which 100 parts by weight of isobutylene-isoprene butyl rubber having a mole percent unsaturation of 1.5 to 2.0 and a viscosity average molecular weight of about 500,000 was compounded with 50 parts by weight of HAF black, 1 part by weight of bismercaptomethyl-m-xylene and 3 parts by weight of zinc oxide, and heated for ½ hour at 307° F. It was noted that the compounded rubber was not cured at the end of the ½ hour period.

The following examples are given in order to illustrate the practice of the present invention and show some of the improved properties obtained by curing halogenated, low unsaturation rubber with polythiol organic compounds. Throughout the examples reference will be made to chlorinated and brominated butyl rubbers. The chlorinated butyl rubber was prepared by chlorinating a copolymer containing about 97 wt. percent isobutylene and 3 wt. percent isoprene which had a viscosity average molecular weight of 486,000. The chlorinated copolymer obtained contained 1.12 wt. percent chlorine and had a viscosity average molecular weight of 460,000. The brominated butyl rubber was prepared from a copolymer containing about 97 wt. percent isobutylene and 3 wt. percent isoprene which had a viscosity average molecular weight of 491,000. The brominated copolymer contained 2.49 wt. percent bromine and had a viscosity average molecular weight equal to that of the original copolymer.

EXAMPLE 1

Chlorinated butyl rubber was compounded with zinc oxide and one of the following: 1,5 pentane dithiol, glycol dimercaptoacetate, or tetramethylthiuramdisulfide (TMTDS). Since TMTDS is presumed capable of forming two cross-links between polymer molecules per molecule of TMTDS and the aforementioned dithiols are believed capable of producing only one such cross-link, two moles of the dithiols were used for each mole of thiuram disulfide in the following recipes:

| Ingredients | Parts by Weight | | | |
|---|---|---|---|---|
| | A | B | C | D |
| Chlorinated butyl rubber | 100 | 100 | 100 | 100 |
| SRF carbon black | 50 | 50 | 50 | 50 |
| Stearic acid | 1 | 1 | 1 | 1 |
| Zinc oxide | 3 | 3 | 3 | 3 |
| 1,5 pentane dithiol | 0.56 | ------- | ------- | ------- |
| Glycol dimercaptoacetate | ------- | 0.88 | ------- | ------- |
| Tetramethylthiuramdisulfide | ------- | ------- | 0.5 | ------- |

Each of the above non-rubber ingredients was added to the chlorinated butyl on a rubber mill at 80 to 90° F. in the conventional manner. A sample of each chlorinated butyl rubber so compounded was cured for 15 or 30 minutes at 307° F. The physical properties of the vulcanizates are set forth in Table I.

*Table I*

| Properties | A | | B | | C | | D | |
|---|---|---|---|---|---|---|---|---|
| | 15 Min. | 30 Min. | 15 Min. | 30 Min. | 15 Min. | 30 Min. | 15 Min. | 30 Min. |
| 200% Modulus, p.s.i. | 1,160 | 1,070 | 1,140 | 1,300 | 680 | 660 | 400 | 430 |
| 300% Modulus, p.s.i. | 1,900 | 1,910 | 1,960 | 1,930 | 1,180 | 1,220 | 870 | 840 |
| Tensile, p.s.i. | 2,240 | 2,270 | 2,280 | 2,060 | 2,090 | 2,100 | 1,390 | 1,880 |
| Elongation, percent | 380 | 380 | 390 | 310 | 500 | 500 | 550 | 570 |

Samples of B and C above were cured for 45 and 90 minutes at 250° F. The physical properties of the vulcanizates are shown in Table II.

*Table II*

| Properties | B | | C | |
|---|---|---|---|---|
| | 45 Min. | 90 Min. | 45 Min. | 90 Min. |
| 200% Modulus, p.s.i. | 780 | 1,390 | 770 | 910 |
| 300% Modulus, p.s.i. | 1,440 | 2,290 | 1,290 | 1,500 |
| Tensile, p.s.i. | 2,590 | 2,500 | 2,070 | 2,050 |
| Elongation, percent | 510 | 340 | 540 | 460 |

Samples of recipes B and C above were also cured 15 and 30 minutes at 340° F. The physical properties of vulcanizates are shown in Table III.

*Table III*

| Properties | B | | C | |
|---|---|---|---|---|
| | 5 Min. | 15 Min. | 5 Min. | 15 Min. |
| 200% Modulus, p.s.i. | 900 | 970 | 550 | 680 |
| 300% Modulus, p.s.i. | 1,720 | 1,750 | 1,070 | 1,270 |
| Tensile, p.s.i. | 2,580 | 2,320 | 2,220 | 2,270 |
| Elongation, percent | 450 | 400 | 560 | 500 |

The data in Tables I, II, and III show that when small amounts of 1,5 pentane dithiol and glycol dimercaptoacetate are used in conjunction with zinc oxide (recipes A and B) they produce vulcanizates, whether prepared at both low and high temperatures, which have greater tensile strengths than similar vulcanizates obtained with either zinc oxide alone (recipe D) or with zinc oxide and TMTDS (recipe C). Moreover, the cure rates for the dithiol compounded chlorinated butyl rubber were faster than those obtained with the TMTDS and/or zinc oxide recipes. This is reflected in the greatly improved moduli of the dithiol vulcanizates in contrast to those of the TMTDS and/or zinc oxide cures.

Samples of recipes A, B, C and D that were cured for 30 minutes at 307° F. were aged for 168 hours at 250° F. to compare the effect of heat on the vulcanizates. The physical properties of the vulcanizates after aging at the aforementioned elevated temperature are set forth in Table IV.

*Table IV*

| Properties | A | B | C | D |
|---|---|---|---|---|
| 200% Modulus, p.s.i. | 760 | 1,170 | 520 | 270 |
| 300% Modulus, p.s.i. | 1,280 | ------- | 880 | 460 |
| Tensile, p.s.i. | 1,560 | 1,680 | 1,160 | 790 |
| Elongation, percent | 340 | 290 | 380 | 480 |

The results in Table IV show that the vulcanizates obtained with recipes A and B retain their physical properties better than those prepared from recipes C and D. Thus, halogenated butyl rubber cured with polythiols in accordance with the present invention is of particular value in articles requiring a high resistance to heat.

EXAMPLE 2

The recipes employed in Example 1 were repeated with the exception that the concentrations of the dithiol and the disulfide were increased. Hereafter, these recipes shall be referred to as recipe $A_1$, $B_1$ and $C_1$. Thus, the amount of 1,5 pentane dithiol was increased from 0.56 part by weight to 1.13 parts by weight. Likewise, glycol dimercaptoacetate and TMTDS were increased to 1.83 and 1.0 parts by weight, respectively. The Mooney scorch time for recipe $A_1$ at 260° F. was greater than 30 minutes (time required to cause a five point rise—small Mooney). Receipe $B_1$ had a Mooney scorch time which was more than twice that obtained with recipe $C_1$ (1 phr. of tetramethylthiuramdisulfide). Thus, the polythiol compounds produce a less scorchy rubber stock than that obtained with zinc oxide and tetramethylthiuramdisulfide.

Samples of recipes $A_1$, $B_1$, $C_1$ and D were cured for 15, 30 and 45 minutes at 307° F.

*Table V*

| | $A_1$ | | | $B_1$ | | | $C_1$ | | | D | | |
|---|---|---|---|---|---|---|---|---|---|---|---|---|
| Time (minutes) | 15 | 30 | 45 | 15 | 30 | 45 | 15 | 30 | 45 | 15 | 30 | 45 |
| Properties: | | | | | | | | | | | | |
| 200% Modulus, p.s.i. | 1,020 | 1,170 | 1,130 | 1,130 | 1,340 | 1,240 | 720 | 790 | 730 | 380 | 460 | 430 |
| 300% Modulus, p.s.i. | 1,920 | 2,000 | -------- | 2,007 | 2,200 | -------- | 1,240 | 1,360 | 1,280 | 840 | 940 | 880 |
| Tensile, p.s.i. | 2,200 | 2,080 | 2,160 | 2,330 | 2,210 | 1,870 | 1,990 | 1,890 | 1,920 | 1,870 | 1,870 | 1,790 |
| Elongation, percent | 345 | 315 | 325 | 350 | 375 | 275 | 520 | 470 | 500 | 595 | 525 | 580 |

The above data show that recipes $A_1$ and $B_1$ were substantially cured after curing for only 15 minutes while the vulcanizates obtained with recipes $C_1$ and D were either not fully cured or possessed inferior physical properties. Samples of the vulcanizates obtained after curing for 30 minutes at 307° F. were aged for 168 hours at 250° F. and their physical properties were re-evaluated. The data obtained are in Table VI.

*Table VI*

| Properties | $A_1$ | $B_1$ | $C_1$ | D |
|---|---|---|---|---|
| 200% Modulus, p.s.i. | 750 | 1,160 | 570 | 210 |
| 300% Modulus, p.s.i. | 1,210 | 1,720 | 940 | 330 |
| Tensile, p.s.i. | 1,260 | 1,840 | 1,140 | 440 |
| Elongation, Percent | 320 | 320 | 385 | 490 |

The results show that curing with polythiols in accordance with the present invention enhances the heat aging properties of halogenated butyl rubber vulcanizates. Glycol dimercaptoacetate produced a vulcanizate that was very effective in this regard.

EXAMPLE 3

Example 1 was repeated using higher concentrations of dithiol and disulfide in recipes A, B and C. The corresponding recipes shall hereafter be referred to as $A_2$, $B_2$, $C_2$, $B_3$ and $C_3$. Thus, recipe $A_2$ contained 2.26 parts by weight of 1,5 pentane dithiol, recipe $B_2$ contained 3.50 parts by weight of glycol dimercaptoacetate, recipe $C_2$ contained 2 parts by weight of tetramethylthiuramdisulfide, recipe $B_3$ contained 5.25 parts by weight of glycol dimercaptoacetate and recipe $C_3$ contained 3 parts by weight of TMTDS. The recipes were cured for various periods of time at 250° F. (45 and 90 min.), 307° F. (15 and 30 min.) and 348° F. (5 and 15 mm.). The vulcanizates obtained with the polythiol compounds were generally equivalent in physical properties to those obtained with the combination of TMTDS and zinc oxide and superior to that obtained with zinc oxide alone. The physical properties of the vulcanizates obtained with recipes $B_3$ were generally inferior to that obtained with recipe $B_2$. This indicates that there exists an optimum concentration below about 5 phr. of low molecular weight dithiol for vulcanizates which have high tensile strengths and moduli.

EXAMPLE 4

Chlorinated butyl rubber was compounded in the following recipes on a rubber mill at 80° F. and vulcanized for 30 minutes at 307° F.:

| Ingredients | E | F | G | H | I | J | K | L |
|---|---|---|---|---|---|---|---|---|
| Chlorinated butyl rubber | 100 | 100 | 100 | 100 | 100 | 100 | 100 | 100 |
| SRF carbon black | 50 | 50 | 50 | 50 | 50 | 50 | 50 | 50 |
| Stearic acid | 1 | 1 | 1 | 1 | 1 | 1 | 1 | 1 |
| Zinc oxide | 3 | 3 | 3 | 3 | 3 | 3 | 3 | 3 |
| Tetramethylthiuramdisulfide (TMTDS) | -------- | 1.0 | -------- | -------- | -------- | -------- | -------- | -------- |
| 1,2 ethane dithiol | -------- | -------- | 0.783 | -------- | -------- | -------- | -------- | -------- |
| 1,3 propane dithiol | -------- | -------- | -------- | 0.9 | -------- | -------- | -------- | -------- |
| 1,4 butane dithiol | -------- | -------- | -------- | -------- | 1.02 | -------- | -------- | -------- |
| 1,5 pentane dithiol | -------- | -------- | -------- | -------- | -------- | 1.13 | -------- | -------- |
| Bis-mercaptomethylmetaxylene | -------- | -------- | -------- | -------- | -------- | -------- | 1.65 | -------- |
| Glycol dimercaptoacetate | -------- | -------- | -------- | -------- | -------- | -------- | -------- | 0.75 |

Samples of each of the vulcanizates in Example 4 were evaluated with the Goodrich Flexometer (ASTM Standards on Rubber Products D623–41T Method A). The following conditions were employed in evaluating the flexing properties of each of the vulcanizates. The load was 118 lbs. per square inch, the stroke was 0.25 inch and the frequency was 32 cps. The results of the test which was carried out at an oven temperature of 100° C. are given in Table VII.

*Table VII*

| Vulcanizate | Permanent Set, Percent | Dynamic Drift, Percent | Temperature Rise, ° C. | Appearance |
|---|---|---|---|---|
| Recipe: | | | | |
| E | (1) | (1) | (1) | (1) |
| F | 2.3 | 0.0 | 24 | Excellent. |
| G | 2.0 | 0.0 | 26 | Do. |
| H | 1.0 | 0.0 | 22 | Do. |
| I | 0.7 | 0.0 | 23 | Do. |
| J | 1.0 | 0.0 | 22 | Do. |
| K | 0.8 | 0.0 | 19 | Do. |
| L | 1.7 | 0.5 | 24 | Do. |

1 Failed.

The data in Table VII demonstrate that curing halogenated butyl rubber with polythiol organic compounds and zinc oxide results in vulcanizates having excellent flexing properties even under a severe load (118 lbs. per square inch). The vulcanizates obtained particularly with the dithiol compounds had in general less than one-half the permament set of the vulcanizates obtained with the TMTDS compound, and in addition, a smaller rise in temperature. This indicates that the vulcanizates of the present invention would be quite suitable in articles which are continually subjected to flexing such as rubber springs.

EXAMPLE 5

The dynamic properties of the vulcanizates prepared in Example 4 were evaluated. The method employed is described in ASTM Standards for Rubber Products D945–48T (Modified Yerzley). The results obtained are set forth in Table VIII.

*Table VIII*

| Vulcanizate | Abs. Damp. $10^{-6}$ poises × cps. | K. Dynamic Modulus $10^{-7}$ dynes/cm.$^2$ | Relative Damping, Percent |
|---|---|---|---|
| Recipe: | | | |
| E | 2.14 | 5.30 | 27.3 |
| F | 2.16 | 6.20 | 24.2 |
| G | 1.88 | 5.53 | 23.9 |
| H | 1.66 | 5.90 | 20.0 |
| I | 1.62 | 6.28 | 18.8 |
| J | 1.60 | 6.34 | 18.4 |
| K | 1.76 | 6.45 | 19.7 |
| L | 1.67 | 6.73 | 18.0 |

The dithiol cured vulcanizates, especially those obtained with higher molecular weight dithiol compounds, have decidedly lower percent relative damping (20 to 25% lower) without a significant increase in dynamic modulus.

EXAMPLE 6

The vulcanizates prepared in Example 4 were cut in the shape of dumb-bells that were 0.75 inch thick and 0.25 inch wide at the narrowest part, stretched 50% at room temperature for ½ hour and then placed in a closed vessel while stretched and there exposed to air containing 0.2 volume per cent ozone. The times required for each sample to crack and break are set forth in Table IX.

*Table IX*

| Vulcanizate | Time to Crack (Minutes) | Time to Break (Minutes) |
|---|---|---|
| Recipe: | | |
| F | 54 | 148 |
| G | 62 | 180 |
| H | 78 | 189 |
| I | 61 | 160 |
| J | 89 | 187 |
| K | 87 | 192 |
| L | 129 | 371 |

The data in Table IX show that in every case the dithiol cured vulcanizates were more resistant to the attack of ozone than the TMTDS cured rubber (recipe F). The glycol dithiol vulcanizate, the most resistant vulcanizate to ozone, lasted almost three times as long as the TMTDS vulcanizate control in this test.

EXAMPLE 7

The vulcanizates prepared in Example 4 were evaluated for volume swell in cyclohexane. Each vulcanizate was submerged in cyclohexane for 48 hours at 25° C., blotted dry and weighed in a sealed vessel of known weight. The percent weight increase was determined for each vulcanizate since this is an indication of the cross-link density of the vulcanizate. The results which are given in Table X show that in every instance the dithiol vulcanizates have a smaller weight increase than that obtained with the vulcanizate prepared with TMTDS and zinc oxide or zinc oxide alone curing systems. The superior volume swell measurements obtained with the dithiol vulcanizates are in agreement with the high moduli, better aging properties and superior dynamic properties generally found with the dithiol in these vulcanizates.

*Table X*

CYCLOHEXANE TEST—VULCANIZATE WEIGHT INCREASE

| Vulcanizate | Percent Weight Increase |
|---|---|
| Recipe: | |
| E | 272 |
| F | 192 |
| G | 190 |
| H | 168 |
| I | 175 |
| J | 166 |
| K | 155 |
| L | 167 |

EXAMPLE 8

One hundred parts by weight of chlorinated isobutylene-isoprene butyl rubber, containing 1.28 wt. percent combined chlorine, having an average viscosity molecular weight of 571,000 and a mole percent unsaturation of 0.55, was compounded with 50 parts by weight of HAF carbon black and one part by weight stearic acid. One hundred parts by weight of the compound chlorinated butyl rubber was blended with 2.43 parts by weight of glycol dimercaptoacetate and portions of the blend were cured for 60 and 90 minutes at 307° F. The original and heat aged properties of these vulcanizates are given in Table XI.

*Table XI*

| ORIGINAL PROPERTIES | | |
|---|---|---|
| Cure Time | 60 Min. | 90 Min. |
| 300% Modulus | 350 | 420 |
| Tensile, p.s.i | 540 | 720 |
| Elongation, percent | 655 | 595 |
| **PROPERTIES AFTER AGING 168 HOURS AT 250° F.** | | |
| 300% Modulus | 960 | 1,150 |
| Tensile, p.s.i | 1,090 | 1,400 |
| Elongation, percent | 355 | 365 |
| **PROPERTIES AFTER AGING 16 HOURS AT 380° F.** | | |
| 300% Modulus | 360 | 360 |
| Tensile, p.s.i | 420 | 520 |
| Elongation, percent | 230 | 280 |

The data in Table XI show that not only do the polythiols cure chlorinated butyl rubber in the absence of any other curing agent, e.g. zinc oxide, but that the properties of the vulcanizate improve on aging, especially when aged at temperatures around 250° F. This unique ability on the part of these vulcanizates makes them very suitable for such things as steam hoses since the hoses will increase in strength with use.

EXAMPLE 9

One hundred parts by weight of brominated butyl rubber, described above, was compounded with 50 parts by weight of SRF carbon black and one part of stearic acid. Portions (151 parts by weight) of the compounded brominated butyl rubber were compounded with various curing agents in the amounts shown below:

*Table XII*

| Recipes | M | N | O | P | Q | R | S |
|---|---|---|---|---|---|---|---|
| Masterbatch | 151 | 151 | 151 | 151 | 151 | 151 | 151 |
| Glycol dimercaptoacetate | 0.88 | | | | | | 1.75 |
| Durenedithiol | | 0.99 | | | | | |
| 1,4 Butanedithiol | | | 0.51 | | | | |
| TMTDS | | | | | 0.50 | | |
| 1,5 Pentaneeithiol | | | | 0.56 | | | |
| Zinc Oxide | 3 | 3 | 3 | 3 | 3 | 3 | |

Recipes M to R were cured for 15 and 30 minutes at 307° F. and recipe S was cured for 60 and 90 minutes at the same temperature. The properties of the brominated butyl rubber vulcanizates are given in Table XIII.

*Table XIII*

ORIGINAL PROPERTIES

| Recipes | M | | N | | O | | P | | Q | | R | | S | |
|---|---|---|---|---|---|---|---|---|---|---|---|---|---|---|
| Cure Time (Min.) | 15 | 30 | 15 | 30 | 15 | 30 | 15 | 30 | 15 | 30 | 15 | 30 | 60 | 90 |
| 100% Modulus, p.s.i | 590 | 620 | 690 | 630 | 475 | 490 | 460 | 480 | 400 | 400 | 280 | 325 | 215 | 215 |
| 200% Modulus, p.s.i | 1,560 | 1,570 | -------- | -------- | 1,450 | 1,440 | 1,370 | 1,380 | 980 | 1,020 | 760 | 810 | 375 | 510 |
| 300% Modulus, p.s.i | -------- | -------- | -------- | -------- | -------- | -------- | -------- | -------- | -------- | -------- | 1,350 | 1,410 | 1,110 | 1,000 |
| Tensile, p.s.i | 1,750 | 1,890 | 1,270 | 1,340 | 1,700 | 1,640 | 1,700 | 1,750 | 1,350 | 1,440 | 1,830 | 1,850 | 1,620 | 1,550 |
| Elongation, percent | 245 | 260 | 185 | 195 | 245 | 230 | 255 | 265 | 305 | 295 | 426 | 410 | 425 | 450 |
| Hardness, Shore A | 62 | 64 | 63 | 64 | 60 | 62 | 60 | 61 | 60 | 59 | 55 | 55 | 51 | 52 |
| Percent Volume Swell [1] | 148 | 148 | 124 | 124 | 142 | 140 | 143 | 141 | 153 | 155 | 194 | 190 | 223 | 230 |

PROPERTIES AFTER AGING 168 HOURS AT 250° F. IN CIRCULATING AIR OVEN

| | M 15 | M 30 | N 15 | N 30 | O 15 | O 30 | P 15 | P 30 | Q 15 | Q 30 | R 15 | R 30 | S 60 | S 90 |
|---|---|---|---|---|---|---|---|---|---|---|---|---|---|---|
| 200% Modulus, p.s.i | 1,240 | 1,150 | -------- | 1,250 | 1,240 | 1,250 | 1,000 | 950 | 1,000 | 1,100 | 1,100 | 1,180 | 690 | 620 |
| Tensile, p.s.i | 1,480 | 1,500 | 1,350 | 1,300 | 1,570 | 1,490 | 1,350 | 1,200 | 1,300 | 1,400 | 1,250 | 1,350 | 1,175 | 1,110 |
| Elongation, percent | 265 | 295 | 210 | 215 | 255 | 235 | 275 | 245 | 280 | 275 | 225 | 245 | 310 | 320 |

PROPERTIES AFTER AGING 16 HOURS AT 380° F. IN CIRCULATING AIR OVEN

| | M 15 | M 30 | N 15 | N 30 | O 15 | O 30 | P 15 | P 30 | Q 15 | Q 30 | R 15 | R 30 | S 60 | S 90 |
|---|---|---|---|---|---|---|---|---|---|---|---|---|---|---|
| 300% Modulus, p.s.i | -------- | -------- | 300 | 275 | 200 | 200 | 230 | 160 | 410 | 400 | 250 | 250 | 270 | 280 |
| Tensile, p.s.i | 375 | 350 | 370 | 375 | 250 | 260 | 260 | 240 | 540 | 510 | 320 | 360 | 400 | 450 |
| Elongation, percent | 300 | 300 | 390 | 465 | 500 | 500 | 600 | 555 | 410 | 405 | 500 | 520 | 460 | 535 |

[1] Cyclohexane at 25° C.

The results in Table XIII show that brominated butyl rubber can be satisfactorily cured with various polythiol compounds in the presence or absence of a metal oxide. Several of the vulcanizates, particularly recipes N, O and R, were strongly resistant to heat.

It is not intended to restrict the present invention to the foregoing examples which are given to merely demonstrate some of the embodiments of the invention. It should only be limited by the appended claims in which it is intended to claim all the novelty inherent in the invention as well as all of the modifications and equivalents coming within the scope and spirit of the invention.

What is claimed is:

1. Process for curing halogenated rubbery copolymer of 85 to 99.5 wt. percent of a $C_4$ to $C_7$ isoolefin and 15 to 0.5 wt. percent of a multiolefin containing 4 to 14 carbon atoms per molecule, said halogenated copolymer being chosen from the group consisting of brominated and chlorinated copolymers which comprises mixing said rubber with 0.1 to 15 parts by weight per 100 parts of rubber of organic polythiol substance selected from the group consisting of 1,2 ethane dithiol, 1,3 propane dithiol, 1,4 butane dithiol, 1,5 pentane dithiol, 1,6 hexane dithiol, glycol dimercaptoacetate, bismercaptomethyl-m-benzene, bismercaptomethyl-m-xylene, bismercaptomethyl durene, 2,4,6 mercaptomethyl phenol and 1,2,3 propane trithiol and heating the mixture at an elevated temperature.

2. Process for curing halogenated rubbery copolymer of 85 to 99.5 wt. percent of a $C_4$ to $C_7$ isoolefin and 15 to 0.5 wt. percent of a multiolefin containing 4 to 14 carbon atoms per molecule, said halogenated copolymer being chosen from the group consisting of brominated and chlorinated copolymers which comprises mixing said rubber with 0.1 to 15 parts by weight per 100 parts of rubber of an organic thiol compound having at least two thiol groups selected from the group consisting of 1,2 ethane dithiol, 1,3 propane dithiol, 1,4 butane dithiol, 1,5 pentane dithiol, 1,6 hexane dithiol, glycol dimercaptoacetate, bismercaptomethyl-m-benzene, bismercaptomethyl-m-xylene, bismercaptomethyl durene, 2,4,6 mercaptomethyl phenol and 1,2,3 propane trithiol and heating the mixture to a temperature of 250° F. or more for from a few minutes to several hours.

3. Process according to claim 2 in which the thiol compound contains 2 to 6 thiol groups.

4. Process for curing halogenated rubbery copolymer of 85 to 99.5 wt. percent of a $C_4$ to $C_7$ isoolefin and 15 to 0.5 wt. percent of a multiolefin containing 4 to 14 carbon atoms per molecule, said halogenated copolymer being chosen from the group consisting of brominated and chlorinated copolymers which comprises mixing said rubber with 0.1 to 15 parts by weight per 100 parts of rubber of organic thiol compound having at least two thiol groups, said compound being selected from the group consisting of 1,2 ethanol dithiol, 1,3 propane dithiol, 1,4 butane dithiol, 1,5 pentane dithiol, 1,6 hexane dithiol, glycol dimercaptoacetate, bismercaptomethyl - m - benzene, bismercaptomethyl-m-xylene, bismercaptomethyl durene, 2,4,6 mercaptomethyl phenol and 1,2,3 propane trithiol, and heating the mixture at a temperature of 250° F. or more until cured.

5. Process for curing halogenated rubbery copolymers of 85 to 99.5 wt. percent of isobutylene and 15 to 0.5 wt. percent of isoprene, said halogenated copolymer being chosen from the group consisting of brominated and chlorinated copolymers which comprises mixing said rubber with 0.5 to 10 parts by weight per 100 parts of rubber of a bivalent metal oxide and 0.1 to 15 parts by weight per 100 parts of rubber of an organic thiol compound selected from the group consisting of 1,2 ethane dithiol; 1,3 propane dithiol; 1,4 butane dithiol; 1,5 pentane dithiol; 1,6 hexane dithiol; glycol dimercaptoacetate; bismercaptomethyl-m-benzene; bismercaptomethyl-m-xylene; bismercaptomethyl durene; 2,4,6 mercaptomethyl phenol; and 1,2,3 propane trithiol; and heating the mixture at 250 to 400° F. for from a few minutes to several hours.

6. Process according to claim 5 in which the metal in the metal oxide is low melting.

7. Process for curing halogenated rubbery copolymers of 85 to 99.5 wt. percent of isobutylene and 15 to 0.5 wt. percent of a multiolefin containing 4 to 14 carbon atoms per molecule, said halogenated copolymer being chosen from the group consisting of brominated and chlorinated copolymers having a mole percent unsaturation of about 0.5 to 15 and containing at least about 0.5 wt. percent but not more than 3 atoms of combined halogen per double bond in the copolymer, which comprises mixing 100 parts by weight of said copolymer with from about 0.1 to 15 parts by weight of an organic dithiol compound selected from the group consisting of 1,2 ethane dithiol; 1,3 propane dithiol; 1,4 butane dithiol; 1,5 pentane dithiol; 1,6 hexane dithiol; glycol dimercaptoacetate; bismercaptomethyl-m-benzene; bismercaptomethyl-m-xylene; bismercaptomethyl durene; 2,4,6 mercaptomethyl phenol; and 1,2,3 propane trithiol; and about 0.5 to 10 parts by weight of bivalent metal oxide and heating the mixture at 250 to 400° F. for from 5 to 90 minutes.

8. Process according to claim 7 in which the dithiol compound is a $C_1$ to $C_{10}$ alkyl dithiol.

9. Process according to claim 7 in which the bivalent metal oxide is zinc oxide and the dithiol compound is glycoldimercaptoacetate.

10. Vulcanized rubber which comprises a major proportion of halogenated rubber copolymer of 85 to 99.5 wt percent of a $C_4$ to $C_7$ isoolefin and 15 to 0.5 wt. percent of a multiolefin containing 4 to 14 carbon atoms per molecule, said halogenated copolymer being chosen from the group consisting of brominated and chlorinated copolymers and 0.1 to 15 parts by weight per 100 parts of rubber of organic polythiol substance chosen from the group consisting of 1,2 ethane dithiol, 1,3 propane dithiol, 1,4 butane dithiol, 1,5 pentane dithiol, 1,6 hexane dithiol, glycol dimercaptoacetate, bismercaptomethyl-m-benzene, bismercaptomethyl-m-xylene, bismercaptomethyl durene, 2,4,6 mercaptomethyl phenol and 1,2,3, propane trithiol.

11. Vulcanized rubber which comprises a major proportion of halogenated rubbery copolymer of 85 to 99.5 wt. percent of isobutylene and 15 to 0.5 wt. percent of isoprene, said halogenated copolymer being chosen from the group consisting of brominated and chlorinated copolymers and 0.1 to 15 parts by weight per 100 parts of rubber of organic thiol compound having at least two thiol groups selected from the group consisting of 1,2 ethane dithiol, 1,3 propane dithiol, 1,4 butane dithiol, 1,5 pentane dithiol, 1,6 hexane dithiol, glycol dimercaptoacetate, bismercaptomethyl-m-benzene, bismercaptomethyl-m-xylene, bismercaptomethyl durene, 2,4,6 mercaptomethyl phenol and 1,2,3 propane trithiol.

12. Vulcanized rubber according to claim 11 in which the copolymer is chlorinated.

13. Vulcanized rubber according to claim 11 in which the copolymer is brominated.

References Cited in the file of this patent

UNITED STATES PATENTS 2,598,407 Marvel ---------------- May 27, 1952

OTHER REFERENCES

Zimmerman et al.: "Handbook of Material Trade Names," Ind. Research Service, N. H. (1953 edition), page 98.